United States Patent
Masuda (10) Patent No.: US 11,027,711 B2
(45) Date of Patent: Jun. 8, 2021

(54) ANTI-LOCK BRAKE CONTROL DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 419 days.

(21) Appl. No.: 15/711,534

(22) Filed: Sep. 21, 2017

(65) Prior Publication Data

US 2018/0015909 A1 Jan. 18, 2018

Related U.S. Application Data

(63) Continuation of application No. PCT/JP2016/058710, filed on Mar. 18, 2016.

(30) Foreign Application Priority Data

Mar. 26, 2015 (JP) ............................. JP2015-064209

(51) Int. Cl.
*B60T 8/172* (2006.01)
*B60T 8/173* (2006.01)
*B60T 8/1761* (2006.01)

(52) U.S. Cl.
CPC .............. *B60T 8/172* (2013.01); *B60T 8/173* (2013.01); *B60T 8/1761* (2013.01); *B60T 8/17616* (2013.01)

(58) Field of Classification Search
CPC ........ B60T 8/172; B60T 8/1761; B60T 8/173; B60T 8/17616; B60T 2270/10;
(Continued)

(56) References Cited

U.S. PATENT DOCUMENTS 5,123,714 A * 6/1992 Mori ....................... B60T 8/173
 303/199
5,425,574 A * 6/1995 Sano ....................... B60T 8/173
 303/177

(Continued)

FOREIGN PATENT DOCUMENTS

| CN | 102186705 | 9/2011 |
| CN | 103287411 | 9/2013 |

(Continued)

OTHER PUBLICATIONS

Chinese Office Action dated Mar. 19, 2019 in corresponding Chinese Patent Application No. 20168001277.4 (5 pages).

(Continued)

*Primary Examiner* — Christian Chace
*Assistant Examiner* — Jordan S Fei (57) ABSTRACT

The anti-lock brake control device includes: a wheel motion estimator to estimate one or more of an angle, an angular velocity, and an angular acceleration of a wheel; a slip estimator to estimate a slip state of the wheel, using an estimation result of the wheel motion estimator; and an anti-lock controller to give a command for causing a brake device to reduce a braking force, in accordance with the estimated slip state of the wheel. The slip estimator includes delay compensators, such as one or a plurality of filters, which perform delay compensation for the estimation result of the wheel motion estimator. The anti-lock controller gives the command for reducing the braking force, on the basis of a result of predetermined determination including comparison of the plurality of estimation results outputted from the slip estimator.

6 Claims, 6 Drawing Sheets

(58) Field of Classification Search
CPC .............. B60T 2270/602; B60T 8/268; B60G
2800/92; B60L 3/108; B60Q 1/448; B60R
2021/01311; B29K 2055/02; F16D
2500/50816; F02N 2200/0805
See application file for complete search history.

(56) References Cited

U.S. PATENT DOCUMENTS

| 8,573,711 | B2 | 11/2013 | Kato et al. |
| 9,616,865 | B2 | 4/2017 | Yasui et al. |
| 2011/0184620 | A1 | 7/2011 | Kato et al. |
| 2015/0081186 | A1 | 3/2015 | Yasui et al. |

FOREIGN PATENT DOCUMENTS

| CN | 104039613 | 9/2014 |
| EP | 0 583 988 A2 | 8/1993 |
| JP | 64-63448 | 3/1989 |
| JP | 4-293654 | 10/1992 |
| JP | 6-64521 | 3/1994 |
| JP | 2002-264785 | 9/2002 |
| JP | 2006-159947 | 6/2006 |
| WO | WO 2007/048947 A1 | 5/2007 |

OTHER PUBLICATIONS

Decision of Grant dated Aug. 30, 2016 in corresponding Japanese Patent Application No. 2015-064209.
International Search Report dated May 17, 2016 in corresponding International Patent Application No. PCT/JP2016/058710.
European Office Action dated Oct. 1, 2018 in corresponding European Patent Application No. 16768682.3.
International Preliminary Report on Patentability dated Oct. 5, 2017 in corresponding International Patent Application No. PCT/JP2016/058710.
Chinese Office Action dated Mar. 19, 2019 in corresponding Chinese Patent Application No. 201680018277.4 (5 pages).

\* cited by examiner

ANTI-LOCK BRAKE CONTROL DEVICE

CROSS REFERENCE TO THE RELATED APPLICATION

This application is a continuation application, under 35 U.S.C. § 111(a), of international application No. PCT/JP2016/058710, filed Mar. 18, 2016, which is based on and claims Convention priority to Japanese patent application No. 2015-64209, filed Mar. 26, 2015, the entire disclosure of which is herein incorporated by reference as a part of this application.

BACKGROUND OF THE INVENTION

Field of the Invention

The present invention relates to an anti-lock brake control device for controlling a brake of a vehicle such as an automobile.

Description of Related Art

Conventionally, the following inventions have been proposed as control methods for an anti-lock brake system (ABS) for braking.

1. ABS control in which a threshold value for starting an ABS operation is changed in accordance with the change amount of a pedaling force (Patent Document 1).
2. ABS control in which the upper limit value of deceleration of a wheel is adjusted in accordance with the change amount of a pedaling force (Patent Document 2).

RELATED DOCUMENT

Patent Document

[Patent Document 1] JP Laid-open Patent Publication No. S64-63448
[Patent Document 2] JP Laid-open Patent Publication No. H04-293654

In an anti-lock control device, it is required to swiftly and accurately determine whether a wheel has a slipping tendency, in order to shorten the braking distance of a vehicle. For example, in the case where a slip rate is estimated and the slipping tendency is determined on the basis of comparison with a threshold value, it is necessary to determine that the wheel has a slipping tendency by the fact that the slipping tendency has become sufficiently strong, considering influences of estimation error of the road surface state, estimation error of a wheel velocity sensor, noise, or the like for the threshold value of the slip rate, in order to prevent erroneous operation. The noise can be removed by, for example, a low-pass filter, but delay due to the low-pass filter can become a cause of detection delay.

In the case where severity or rigor of slipping tendency determination is adjusted in accordance with change of the pedaling force as in Patent Documents 1 and 2, there is a possibility that a timing of starting an anti-lock brake operation is delayed due to the above process, for example, when a tire comes to have a slipping tendency by gradual increase in a brake pedaling force from a high load state or when a tire comes to have a slipping tendency by road surface variation from a state in which change in a brake pedaling force is small. In addition, a vehicle operator sometimes unintentionally causes great change in the brake pedaling force because of vehicle vibration, shaking of the foot operating a pedal, or the like. Therefore, in order to prevent erroneous detection, after all, the timing of starting an anti-lock brake operation might inevitably need to be designed conservatively or more securely.

SUMMARY OF THE INVENTION

An object of the present invention is to provide an anti-lock brake control device capable of swiftly and accurately determining that a wheel has a slipping tendency, thereby enabling the braking distance of a vehicle to be shortened.

Hereinafter, the present invention will be described, while referring to the reference characters in the embodiments for convenience sake in order to facilitate the understanding.

An anti-lock brake control device 12 according to the present invention controls a brake device 1 including a brake rotor 3 provided coaxially with a wheel 2, a friction material 4 to contact with the brake rotor 3, and a friction material driving mechanism 5 configured to drive the friction material 4. The anti-lock brake control device 12 includes: a wheel motion estimator 13 configured to estimate one or more of an angle, an angular velocity, and an angular acceleration of the wheel 2; a slip estimator 14 configured to estimate a slip state of the wheel with respect to a ground contact surface, using an estimation result of the wheel motion estimator 13; and an anti-lock controller 15 configured to give a command for reducing a braking force to the friction material driving mechanism in accordance with the slip state of the wheel estimated by the slip estimator 14. The slip estimator 14 includes one or more delay compensators 17a, 17b configured to perform delay compensation for the estimation result of the wheel motion estimator, and is configured to output a plurality of estimation results different from each other for which delay compensation has been performed, as an estimation result for the slip state of the wheel. The anti-lock controller 15 is configured to give the command for reducing the braking force, on the basis of a result of predetermined determination including comparison of the plurality of estimation results outputted from the slip estimator 14.

The "predetermined determination (including comparison of the plurality of estimation results)" may be a comparison result alone as long as the predetermined determination is based on the plurality of estimation results, or may include another requirement, e.g., determination prescribed appropriately.

According to the above configuration, the slip estimator 14 has one or more delay compensators 17a, 17b for performing delay compensation for the estimation result of the wheel motion estimator 13, and outputs a plurality of different estimation results for which delay compensation has been performed, as an estimation result of the slip state of the wheel 2. The anti-lock controller 15 gives the command for reducing the braking force, on the basis of a result of the predetermined determination including comparison of the plurality of outputted estimation results. Thus, since comparison is performed using a plurality of different estimation results for which delay compensation has been performed, for example, noise is removed and the strength of the slipping tendency is extracted. Accordingly, it is possible to accurately determine that the wheel 2 has a slipping tendency, and even if the threshold value is set to be small, erroneous determination is prevented. Therefore, the determination can be swiftly performed. As a result, the braking distance of the vehicle can be shortened.

In the present invention, the slip estimator 14 may include, as the delay compensators 17a, 17b, two or more delay compensators 17a, 17b having frequency characteristics different from each other, and the anti-lock controller 15 may perform the comparison of the plurality of estimation results by using either a difference between the estimation results obtained via the different delay compensators 17a, 17b or a cumulative value of the difference. Thus, since two or more delay compensators 17a, 17b having different frequency characteristics are provided and a difference between estimation results of these two or more delay compensators 17a, 17b is used, it is possible to determine that the wheel has a slipping tendency, further swiftly and accurately. Owing to such fast slip determination, the wheel velocity is less separated from the vehicle body velocity, so that it is possible to keep a more desirable slip state, i.e., a slip state in which the maximum braking force is obtained. The difference may be directly compared, but alternatively, a cumulative value thereof may be calculated and the cumulative value may be compared, whereby it is possible to more accurately determine that the wheel has a slipping tendency.

In the present invention, the anti-lock controller 15 may perform the comparison of the plurality of estimation results by using either a difference between the estimation result obtained via the delay compensator 17a, 17b and the estimation result obtained not via the delay compensator 17a, 17b, or a cumulative value of the difference. Thus, even by using a difference between a slip estimation result obtained via the delay compensator 17a, 17b and an estimation result obtained not via the delay compensator 17a, 17b, it is possible to swiftly and accurately determine that the wheel has a slipping tendency, as compared to the case of performing determination based on comparison between a threshold value and an estimation result obtained not via the delay compensator 17a, 17b.

In the present invention, each delay compensator 17a, 17b may be a state estimator including a feedback element for correcting error between estimation output obtained via an equation of motion and output from the delay compensator. In the case of using such a state estimator, it is possible to determine that the wheel has a slipping tendency, further swiftly and accurately.

In the present invention, each delay compensator 17a, 17b may be a low-pass filter which attenuates a frequency higher than a predetermined frequency. Employing low-pass filters enables simplification of the configurations of the delay compensators 17a, 17b.

In the present invention, the anti-lock controller 15 may give the command for reducing the braking force also when output, from the slip estimator 14, for which delay compensation has not been performed, is equal to or greater than a threshold value, before determination based on comparison of the plurality of estimation results outputted from the slip estimator 14. Thus, in the case of obvious slipping tendency, anti-lock control can be performed more swiftly without taking a calculation time for delay compensation.

In the present invention, the brake device may be an electric brake device. The electric brake has an excellent response because a drive source therefor is a motor. Thus, the effect of enabling swift and accurate determination of the slipping tendency in the anti-lock brake control device of the present invention is more effectively exerted.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
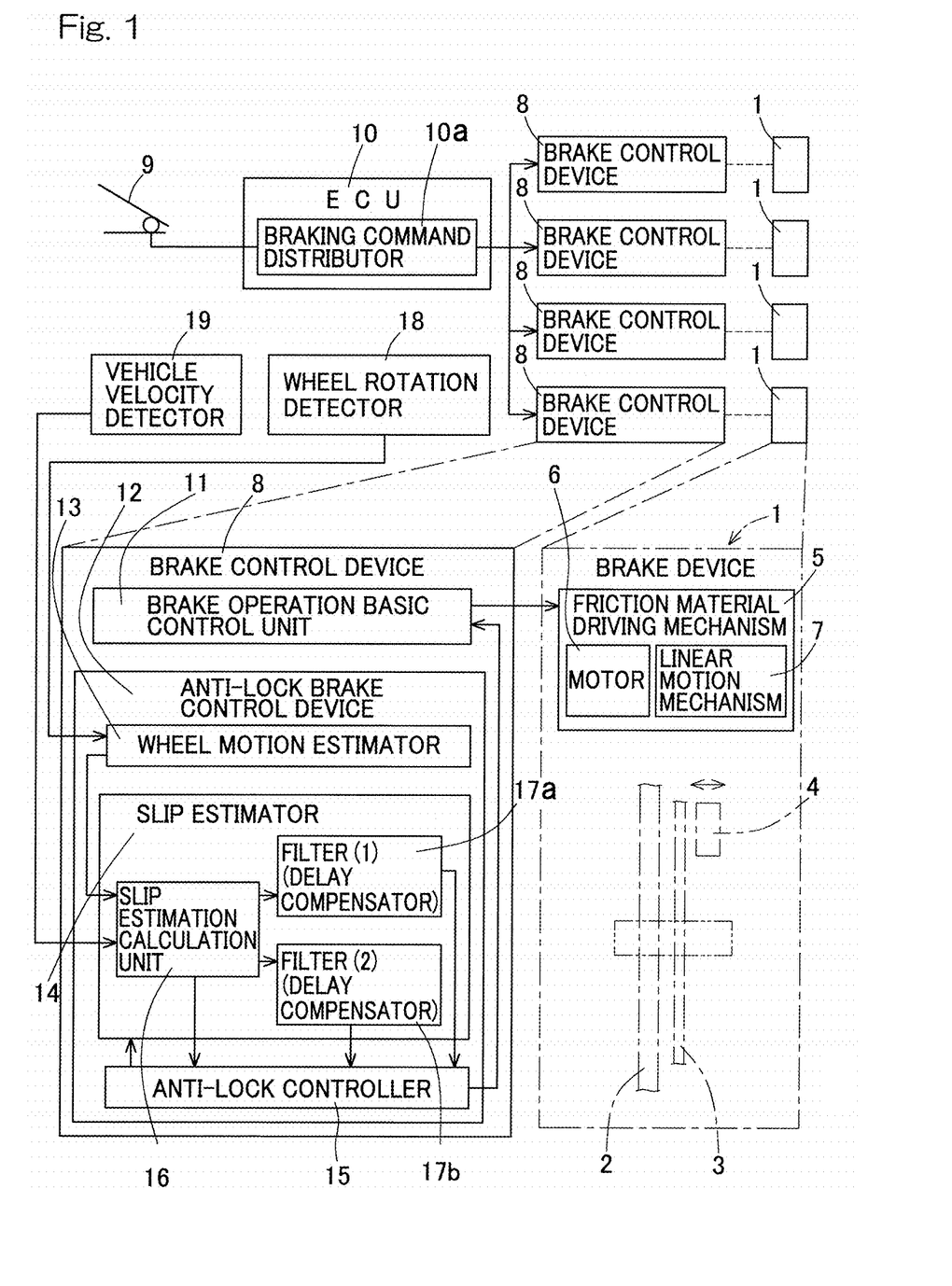
FIG. 1 is a block diagram showing a conceptual configuration of an anti-lock brake control device according to an embodiment of the present invention.
Figure 8:
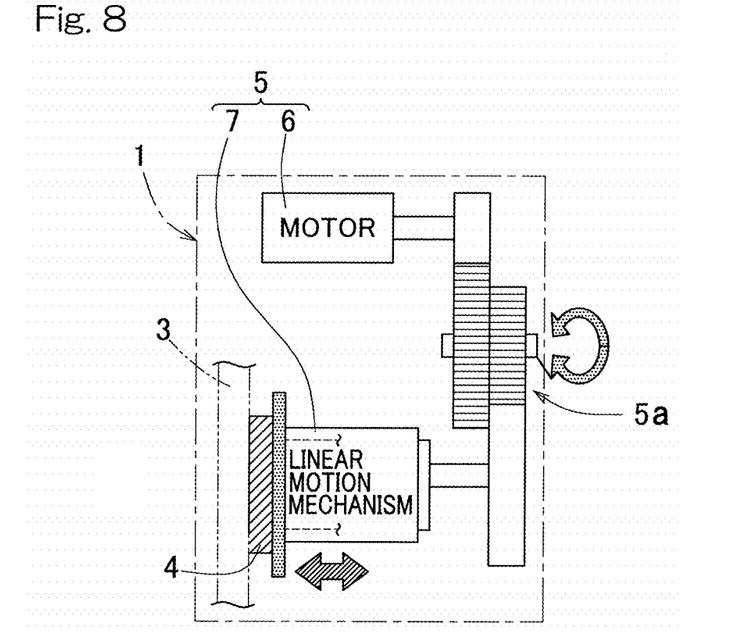
FIG. 8 illustrates an example of a brake device to be controlled by the anti-lock brake control device.

An embodiment of the present invention will be described with reference to the drawings. FIG. 1 shows an entire brake system of a vehicle such as an automobile. Brake devices 1 are provided for all wheels, i.e., two right and left wheels as front wheels and two right and left wheels as rear wheels, respectively. Each brake device 1 includes: a brake rotor 3 which is provided coaxially with the wheel 2 and rotates integrally therewith; a friction material 4 to be contacted with the brake rotor 3; and a friction material driving mechanism 5 which drives the friction material 4 (that is, contacts the friction material 4 with the brake rotor 3). The brake rotor 3 may be a disk type or a drum type. The friction material 4 is a brake pad, a brake shoe, or the like. The friction material driving mechanism 5 may be an electric type or a hydraulic type. In the shown example, the friction material driving mechanism 5 is an electric brake device and is mainly composed of an electric motor 6 and a linear motion mechanism 7, such as a ball screw device or a planetary roller screw mechanism, which converts a rotation of the motor 6 into a forward/backward linear motion of the friction material 4. FIG. 8 shows a specific example of the brake device 1. As shown in FIG. 8, the friction material driving mechanism 5 of the brake device 1 may transmit rotation of the motor 6 to the linear motion mechanism 7 via a speed-reducing mechanism or reduction gear 5a such as a gear train.

In FIG. 1, brake control devices 8 are provided for the respective brake devices 1. A braking command inputted from brake operation portion 9 such as a brake pedal is distributed to the respective brake control devices 8 from a braking command distributor 10a provided to an electronic control unit (ECU) 10 which controls the entirety of the vehicle, and the brake devices 1 are respectively controlled by the corresponding brake control devices 8.

Each brake control device 8 includes: a brake operation basic control unit 11 which controls the friction material driving mechanism 5 in accordance with the braking command given from the braking command distributor 10a provided to the ECU 10; and an anti-lock brake control device 12. The anti-lock brake control device 12 may be provided in the ECU 10 or the like, but in the present embodiment, is provided to each brake control device 8.

The anti-lock brake control device 12 includes a wheel motion estimator 13, a slip estimator 14, and an anti-lock controller 15. The slip estimator 14 includes a slip estimation calculation unit 16, and a first filter 17a and a second filter 17b which are delay compensators. In the description below, the first filter 17a may be also referred to as a filter (1), and the second filter 17b may be also referred to as a filter (2).

The wheel motion estimator 13 estimates one or more of an angle, an angular velocity, and an angular acceleration of rotation of the wheel 2. For example, the wheel motion estimator 13 is configured from a hardware circuit or a software function on a processor (not shown), that is capable of estimating and outputting the angle, the angular velocity, the angular acceleration, or the like in response to input of a detection value from a wheel rotation detector 18 provided to a vehicle bearing (not shown) of the wheel 2, an axle, or the like, by using, specifically, a look up table (LUT) realized or implemented by software or hardware, a predetermined conversion function stored in a library of software, hardware equivalent thereto, or the like (hereinafter, referred to as an "embodied model"). The angular velocity becomes a wheel velocity by being converted with respect to the wheel. As a method for detecting the wheel velocity, in a commercial vehicle, it is general to measure an edge interval of output of about 30 to 50 pulses per one rotation, but for example, a general rotary encoder or a general resolver may be used as the wheel rotation detector 18.

The slip estimator 14 estimates a slip state of the wheel 2 with respect to the ground contact surface, using an estimation result of the wheel motion estimator 13, and basically, estimates a slip rate S1 which is a ratio between a vehicle body velocity $\omega_v$ and a wheel velocity $\omega$ by the slip estimation calculation unit 16. Specifically, the slip estimation calculation unit 16 is configured from a hardware circuit or a software function on a processor (not shown), that is capable of estimating and outputting the slip state of the wheel 2, here, calculating the slip rate S1 in response to input of an estimation result of the wheel motion estimator 13, by using the aforementioned embodied model. The vehicle body velocity $\omega_v$ is obtained from a vehicle velocity detector 19. The vehicle velocity detector 19 is not limited to a sensor that directly detects the vehicle body velocity $\omega_v$, but may detect the vehicle body velocity $\omega_v$ from the rotation velocity of a driven wheel.

As a specific formula for deriving or calculating the slip rate S1, for example, the slip rate S1 may be derived as follows, with 0 defined as a non-slip state and 1 defined as a perfect slip state in which the wheel is locked.

$$S1=(\omega_v-\omega)\cdot\omega_v^{-1}$$

The filters (1), (2) which are the filter delay compensators perform delay compensation for an estimation result of the wheel motion estimator 13, and in the present embodiment, perform delay compensation for the estimation result S1 of the slip estimation calculation unit 16. Each filter (1), (2) is, for example, configured from a state estimator including a feedback element for correcting error between estimation output obtained via an equation of motion described later with reference to FIG. 5 and actual output, i.e., output from the delay compensator, or configured from a low-pass filter as shown in FIG. 6. The low-pass filter attenuates a frequency higher than a predetermined frequency. The two filters (1), (2) have the same configuration except that their frequency characteristics are different from each other, and the first filter (1) has a higher frequency characteristic than the second filter (2). Thus, the slip estimator 14 of the present embodiment has the two filters (1), (2) and outputs a plurality of different estimation results for which delay compensation has been performed, as an estimation result of the slip state of the wheel 2.

The anti-lock controller 15 gives a command, for reducing the braking force, to the friction material driving mechanism 5, in accordance with the slip state of the wheel 2 estimated by the slip estimator 14, e.g., on the basis of a result of predetermined determination including comparison of the plurality of estimation results outputted from the slip estimator 14. Specifically, the anti-lock controller 15 is configured from a hardware circuit or a software function on a processor (not shown), that is capable of generating the command for reducing the braking force and outputting the same to the friction material driving mechanism 5, in response to input of a result of the predetermined determination, by using the aforementioned embodied model. In this case, the anti-lock controller 15 performs comparison of the estimation results from the plurality of filters (1), (2), and this comparison is performed by comparing a threshold value with either a difference between the estimation results obtained via the different filters (1), (2) or a cumulative value of the difference. A specific process example of the anti-lock controller 15 will be described later with reference to FIG. 4. The command for reducing the braking force from the anti-lock controller 15 may be given to the friction material driving mechanism 5 via the brake operation basic control unit 11, or may be directly given to the friction material driving mechanism 5 not via the brake operation basic control unit 11.

Figure 2:
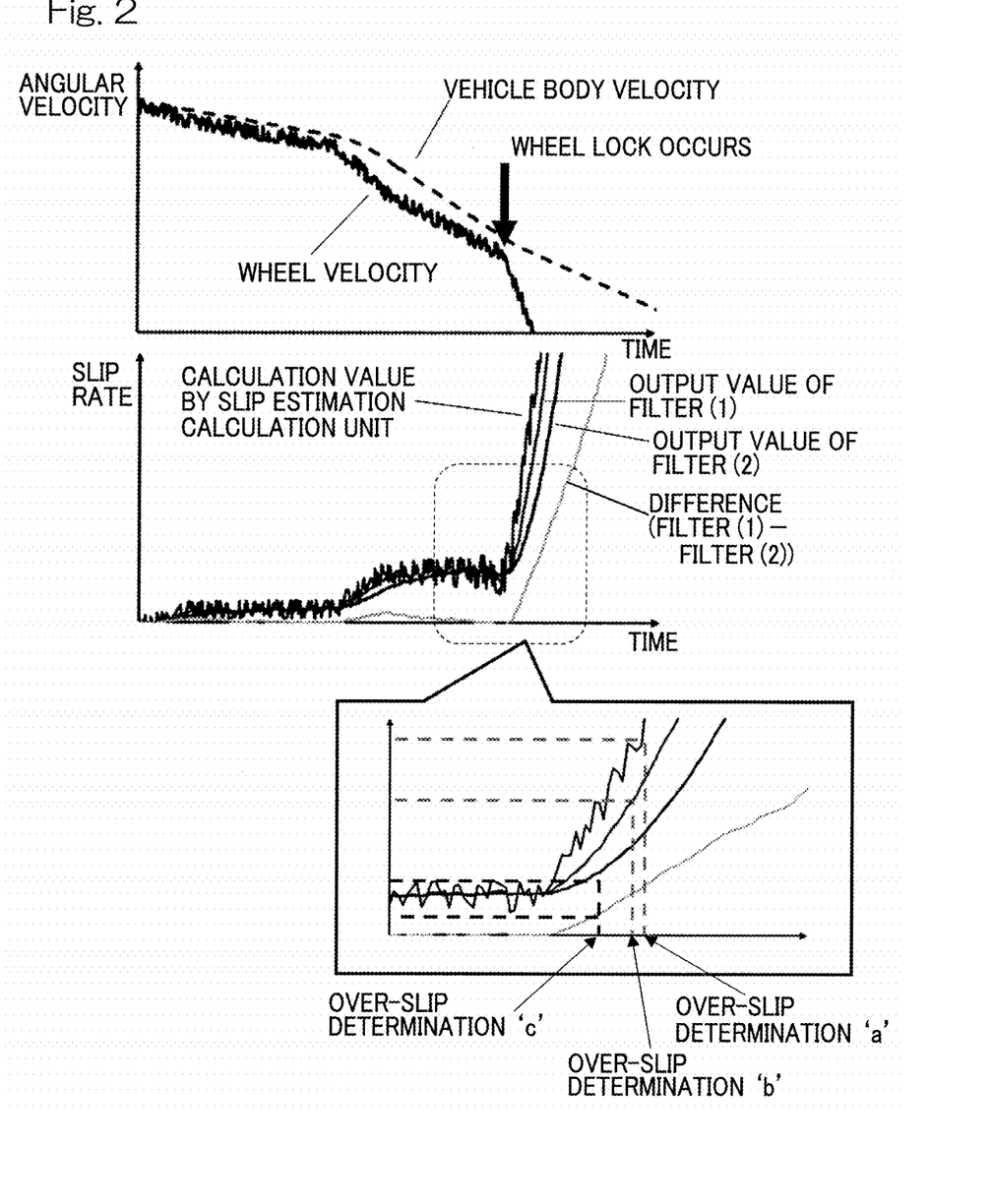
FIG. 2 illustrates operation of the anti-lock brake control device.

Operation of the above configuration will be described. FIG. 2 mainly shows waveforms of a calculation value of the slip rate calculated by the slip estimation calculation unit 16, and waveforms obtained by passing the slip rate through the filters (1), (2). Here, regarding responses of the filters (1), (2), the filter (1) is a faster filter than the filter (2). In addition, a difference (shown in waveform) between the output values of the filter (1) and the filter (2) is shown in FIG. 2. Here, as the increasing tendency of the temporal change rate of the slip rate becomes strong, the output value of the filter (1) is more separated upward from the output value of the filter (2). Therefore, the slipping tendency is determined on the basis of the above difference (shown in waveform). For the determination of the slipping tendency, instead of the above-mentioned difference, the ratio between the slip rates outputted from the filter (1) and the filter (2), a cumulative value of the difference, or the like may be used.

An example of determination of an over-slip state of the wheel is shown in an enlarged diagram at the lower stage in FIG. 2. For example, in the case where the derived slip rate is directly compared with a threshold value, the threshold value is set in consideration of various estimation errors such as noise influence and a road surface state, and occurrence of over-slip is determined at a timing of 'a' in FIG. 2. In the case where the output value of the filter (1) is compared with a threshold value, noise influence is relaxed or lessened and thus the occurrence of over-slip is determined at a timing of 'b', as compared to the determination at the timing of 'a'. In contrast to these, for example, in the case where, in addition to the threshold value for the filter (1), a threshold value for the difference between the output values of the filter (1) and the filter (2) is used as an AND condition, the threshold value can be set strictly as compared to the cases of 'a' and 'b' because the strength of the slipping tendency is determined by the difference as described above. Therefore, the detection can be performed at a timing of 'c' in FIG. 2. Such threshold values can be set as appropriate from experiments, simulation results, or the like.

Although the tendency determination using two lines is performed in this example, the tendency determination may be performed by comparison of three or more lines of signals having different response speeds. In this case, the degree of freedom in the tendency determination is improved owing to a plurality of patterns such as the high-low relationship among the lines.

Figure 3A:
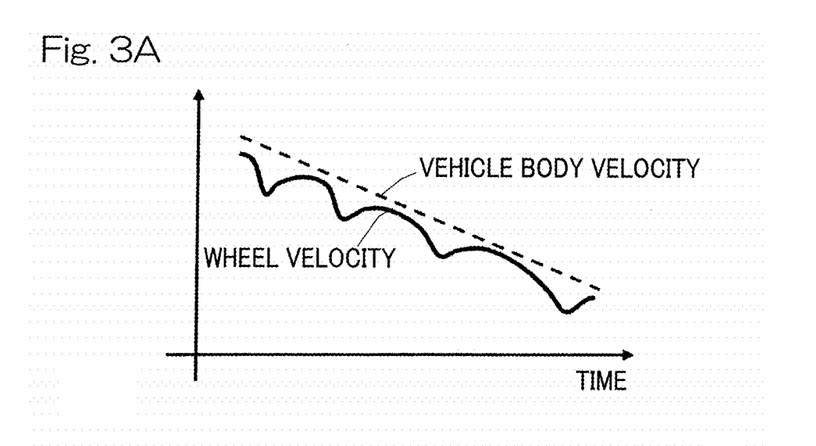
FIG. 3A is a graph showing an example of an anti-lock control waveform by the anti-lock brake control device.
Figure 3B:
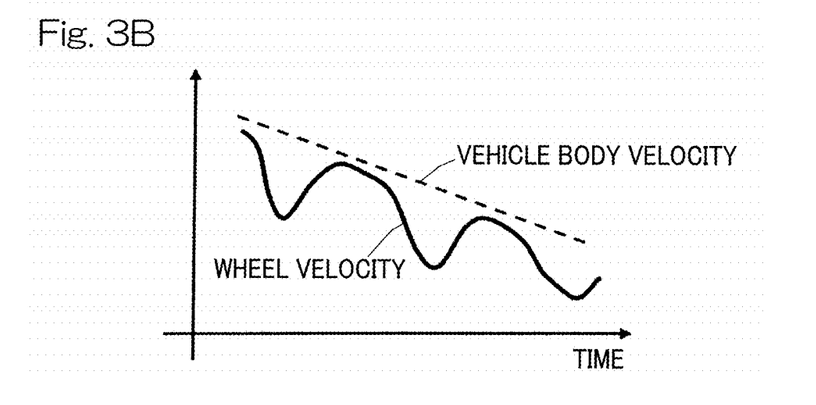
FIG. 3B is a graph showing a comparison example of an anti-lock control waveform in a general anti-lock brake control device including the anti-lock brake control device.

FIGS. 3A and 3B show examples of anti-lock control waveforms. FIG. 3A shows an example in which the present embodiment is applied and over-slip determination is performed at a timing of 'c' in FIG. 2. FIG. 3B shows an example of performing a simple threshold value comparison as in the case of 'a' or 'b' in FIG. 2. As compared to FIG. 3B, in FIG. 3A, the over-slip determination is performed faster and therefore the wheel velocity is less separated from the vehicle body velocity, so that it is possible to keep a more desirable slip state, i.e., a slip state in which the maximum braking force is obtained.

Figure 4:
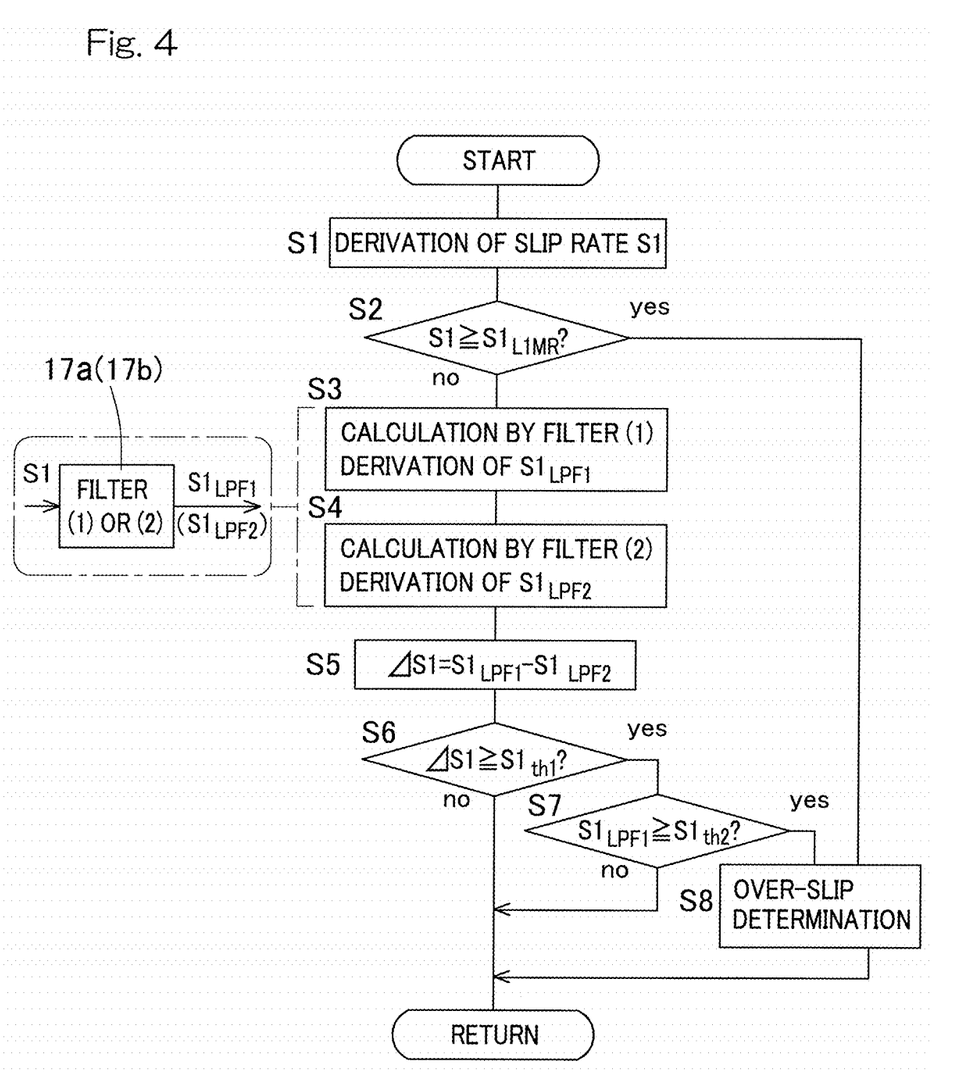
FIG. 4 is a flowchart of an operation example of anti-lock controller in the anti-lock brake control device.

FIG. 4 shows an example of operation performed by the anti-lock controller 15. In FIG. 4, slip rate calculation and filter calculation are processes performed by the slip estimator in FIG. 1. In step S1, the slip estimation calculation unit 16 (FIG. 1) derives the slip rate S1. The derived slip rate S1 is compared with a threshold value $S1_{LIMR}$ (step S2). If the slip rate S1 is equal to or greater than the threshold value $S1_{LIMR}$ (yes in step S2), it is determined that over-slip occurs (step S8). If it is determined that over-slip occurs, a command for causing the brake device 1 to reduce the braking force is given to the friction material driving mechanism 5. In this way, before determination based on comparison of a plurality of estimation results outputted from the slip estimator 14 as described later, the anti-lock controller 15 gives a command for reducing the braking force also when the slip rate S1, which is outputted from the slip estimator 14 and for which delay compensation has not been performed, is equal to or greater than the threshold value $S1_{LIMR}$. Thus, in the case of obvious slipping tendency, anti-lock control can be performed more swiftly without taking a calculation time for delay compensation.

If, in step S2, the slip rate S1 is not equal to or greater than the threshold value $S1_{LIMR}$ (no in step S2), the slip rate $S1_{LPF1}$ is derived by the filter (1) (step S3), a slip rate $S1_{LPF2}$ is derived by the filter (2) (step S4), and then a difference ΔS1 therebetween is calculated (step S5). The difference ΔS1 is compared with the first threshold value $S1_{th1}$ (step S6). If the difference ΔS1 is not equal to or greater than the first threshold value $S1_{th1}$ (no in step S6), return is performed to repeat the process shown in FIG. 4.

If the difference ΔS1 is equal to or greater than the first threshold value $S1_{th1}$ (yes in step S6), the slip rate $S1_{LPF1}$ is compared with a second threshold value $S1_{th2}$ (step S7). Then, if the slip rate $S1_{LPF1}$ is not equal to or greater than the second threshold value $S1_{th2}$ (no in step S7), return is performed to repeat the process shown in FIG. 4. If the slip rate $S1_{LPF1}$ is equal to or greater than the second threshold value $S1_{th2}$ (yes in step S7), it is determined that over-slip occurs (step S8), and a command for causing the brake device 1 to reduce the braking force is given to the friction material driving mechanism 5.

Thus, since comparison is performed using estimation results obtained by performing a plurality of different delay compensations for the slip rate, it is possible to accurately determine that the wheel 2 has a slipping tendency, and even if the threshold value is set to be small, erroneous determination is prevented. Therefore, the determination can be swiftly performed. As a result, the braking distance of the vehicle can be shortened.

Figure 5:
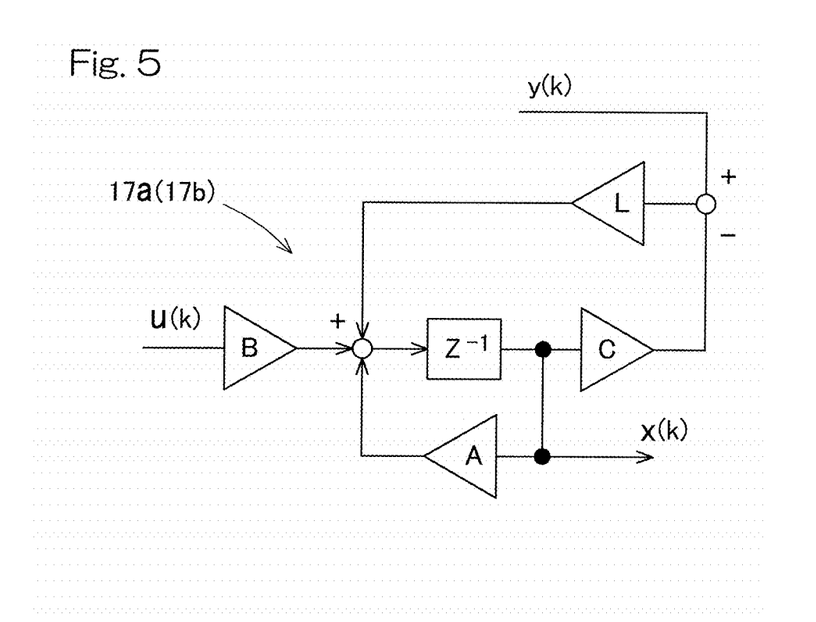
FIG. 5 is a block diagram showing a configuration example of a filter that is a delay compensator of the anti-lock brake control device.
Figure 6:
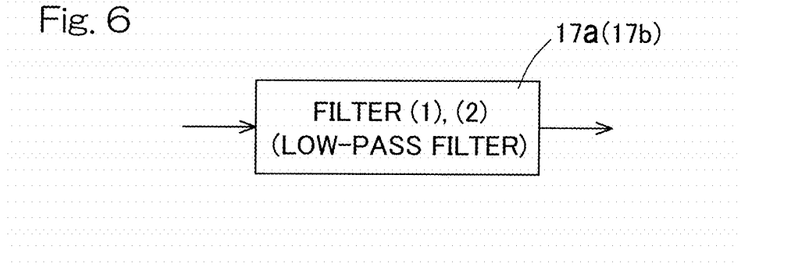
FIG. 6 is a block diagram showing another configuration example of the filter that is the delay compensator of the anti-lock brake control device.

FIG. 5 shows a configuration example of the filter (1) 17a and the filter (2) 17b. The first and second filters (1), (2) have the same configuration except that their constants are different from each other, and therefore only one filter (1) will be described. In the example in FIG. 5, the filter (1) is configured as a state estimation observer.

In FIG. 5, A, B, C are state transition matrices based on an equation of motion of a wheel, u(k) is the braking force, and y(k) is the wheel velocity. x(k) is a filter state quantity. $Z^{-1}$ indicates a delay corresponding to one sampling, and specifically, is implemented by a storage element or the like. L indicates an observer gain, and an error convergence condition is determined by the eigenvalue of (A−LC). An estimation error of the observer is set as e=[estimated value Cx]−[actual measured value y], and by formula expansion, e(k+1)=(A−LC)e(k) is obtained, and thus the eigenvalue of (A−LC) is directly equal to the convergence characteristic.

In configuring the filters (1), (2), for example, it is possible to adjust a parameter relevant to inertia in the state transition matrices. Adjustment may be performed using the value of the observer gain L, or these adjustments may be performed in combination.

The state transition matrices A, B, C based on the equation of motion of the wheel are represented by the following expressions, as an example. The following expressions can be used as a most simple linear state observer.

$$\hat{x}(k+1) = A\hat{x}(k) + Bu(k) + L\{y(k) - \hat{y}(k)\} \quad \text{[Mathematical 1]}$$

$$\hat{y}(k+1) = C\hat{x}(k)$$

$$\hat{x} = [\omega \ \tau_x]^T, A = e^{\begin{bmatrix} 0 & 0 \\ 0 & \frac{1}{J} \end{bmatrix} \tau_s},$$

$$B = \int_0^{t_s} e^{\begin{bmatrix} 0 & 0 \\ 0 & \frac{1}{J} \end{bmatrix} \tau_s} J^{-1} dt, C = [1 \ 0]$$

$\hat{y}$ is an estimated wheel velocity, and $\hat{x}$ is an estimated state quantity.

$t_s$ indicates a sampling period, and J indicates inertia. y is a detected wheel velocity, L is an observer gain, and the convergence characteristic of the observer is changed by the value of L being changed. ω indicates a wheel velocity, and $\tau_x$ indicates an estimated value of a front-rear force torque. u indicates an estimated braking force, and as this value, for example, a value obtained by multiplying a brake torque or a brake friction material pressing force by μ of the friction material and a brake effective diameter, may be used.

Other than the above, the configurations of the filters (1), (2) may be implemented by, for example, a general low-pass filter as shown in FIG. 6, or may be implemented by moving average lines that are different in sampling number.

Figure 7:
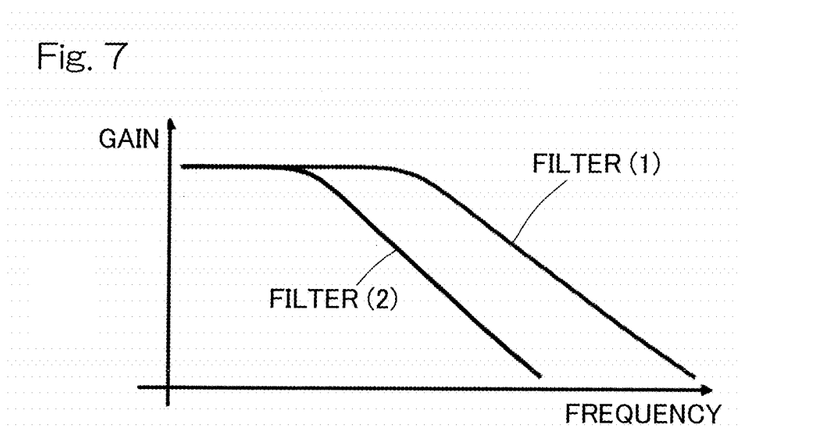
FIG. 7 illustrates examples of frequency characteristics of the filters.

FIG. 7 shows examples of the characteristics of the filters (1), (2). The higher-speed filter (1) may be adjusted to have a higher gain in a high-frequency region than the filter (2).

In the above embodiment, the slip estimator 14 is provided with a plurality of filters (1), (2). However, the slip estimator 14 may be provided with one delay compensator (filter), and the anti-lock controller 15 may perform the comparison of the plurality of estimation results by using either a difference between the estimation result obtained via the delay compensator and the estimation result obtained not via the delay compensator, or a cumulative value of the difference. Also in this case, a delay compensator having the same configuration as the filter (1) can be used.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

1 brake device
2 wheel
3 brake rotor
4 friction material
5 friction material driving mechanism
8 brake control device
12 anti-lock brake control device
13 wheel motion estimator
14 slip estimator
15 anti-lock controller
16 slip estimation calculation unit
17a, 17b filter (delay compensator)

What is claimed is:

1. An anti-lock brake control device which controls a brake device including a brake rotor provided coaxially with a wheel, a friction material to contact with the brake rotor, and a friction material driving mechanism configured to drive the friction material, the anti-lock brake control device comprising:
   a wheel motion estimator configured to estimate one or more of an angle, an angular velocity, and an angular acceleration of the wheel;
   a slip estimator configured to estimate a slip state of the wheel with respect to a ground contact surface, using an estimation result of the wheel motion estimator; and
   an anti-lock controller configured to give a command for reducing a braking force to the friction material driving mechanism in accordance with the slip state of the wheel estimated by the slip estimator, wherein
   the slip estimator includes two or more delay compensators having frequency characteristics different from each other configured to perform delay compensation for the estimation result of the wheel motion estimator, and is configured to output a plurality of estimation results different from each other for which delay compensation has been performed, as an estimation result for the slip state of the wheel, and
   the anti-lock controller is configured to give the command for reducing the braking force, on the basis of a result of predetermined determination including comparison of the plurality of estimation results outputted from the slip estimator and perform the comparison of the plurality of estimation results by using a cumulative value of a difference between the estimation results obtained via the different delay compensators.

2. The anti-lock brake control device as claimed in claim 1, wherein
   each delay compensator is formed by a state estimator including a feedback element for correcting error between estimation output obtained via an equation of motion and output from the delay compensator.

3. The anti-lock brake control device as claimed in claim 1, wherein
   each delay compensator is formed by a low-pass filter which attenuates a frequency higher than a predetermined frequency.

4. The anti-lock brake control device as claimed in claim 1, wherein
   the anti-lock controller gives the command for reducing the braking force also when output, from the slip estimator, for which delay compensation has not been performed, is equal to or greater than a threshold value, before determination based on comparison of the plurality of estimation results outputted from the slip estimator.

5. The anti-lock brake control device as claimed in claim 1, wherein
   the brake device is formed by an electrically operating brake device.

6. An anti-lock brake control device which controls a brake device including a brake rotor provided coaxially with a wheel, a friction material to contact with the brake rotor, and a friction material driving mechanism configured to drive the friction material, the anti-lock brake control device comprising:
   a wheel motion estimator configured to estimate one or more of an angle, an angular velocity, and an angular acceleration of the wheel;
   a slip estimator configured to estimate a slip state of the wheel with respect to a ground contact surface, using an estimation result of the wheel motion estimator; and
   an anti-lock controller configured to give a command for reducing a braking force to the friction material driving mechanism in accordance with the slip state of the wheel estimated by the slip estimator, wherein
   the slip estimator includes one or more delay compensators configured to perform delay compensation for the estimation result of the wheel motion estimator, and is configured to output a plurality of estimation results different from each other for which delay compensation has been performed, as an estimation result for the slip state of the wheel, and
   the anti-lock controller is configured to give the command for reducing the braking force, on the basis of a result of predetermined determination including comparison of the plurality of estimation results outputted from the slip estimator and perform the comparison of the plurality of estimation results by using
   a cumulative value of a difference between the estimation result obtained via the delay compensator and the estimation result obtained not via the delay compensator.

* * * * *